United States Patent [19]
Makibayashi et al.

[11] Patent Number: 4,936,556
[45] Date of Patent: Jun. 26, 1990

[54] LIQUID-SEALED BODY MOUNT

[75] Inventors: Katsunori Makibayashi; Kouji Sawada; Shigeru Haino, all of Toyota; Motoo Kunihiro, Nagoya; Kiyonobu Nariai; Kouichi Mori, both of Toyota, all of Japan

[73] Assignees: Toyo Tire & Rubber Co., Ltd., Osaka, Japan; Toyota Jidosha Kabushiki Kaisha, Aichi, Japan

[21] Appl. No.: 357,426

[22] Filed: May 25, 1989

[30] Foreign Application Priority Data

Jul. 28, 1988 [JP] Japan .................. 63-190087

[51] Int. Cl.$^5$ .............................................. F16F 5/00
[52] U.S. Cl. .................................. 267/140.1; 248/562
[58] Field of Search ............... 248/562; 267/140.1 R, 267/140.1 A, 140.1 C, 219

[56] References Cited

U.S. PATENT DOCUMENTS

| | | | |
|---|---|---|---|
| 4,706,947 | 11/1987 | Makibayashi et al. | 267/140.1 |
| 4,721,291 | 1/1988 | Makibayashi et al. | 267/140.1 |
| 4,753,421 | 6/1988 | Makibayashi et al. | 267/140.1 |
| 4,781,361 | 11/1988 | Makibayashi et al. | 267/140.1 |

FOREIGN PATENT DOCUMENTS

| | | |
|---|---|---|
| 60-139942A1 | 7/1985 | Japan . |
| 60-201136A1 | 10/1985 | Japan . |
| 61-538U1 | 1/1986 | Japan . |
| 62-171540A1 | 7/1987 | Japan . |
| 62-188832A1 | 8/1987 | Japan . |
| 62-224744A1 | 10/1987 | Japan . |
| 63-93276U1 | 6/1988 | Japan . |

Primary Examiner—Duane A. Reger
Attorney, Agent, or Firm—Flynn, Thiel, Boutell & Tanis

[57] ABSTRACT

A liquid-sealed body mount comprising an inner and an outer cylinders concentrically disposed, a first and a second rubber members provided mutually in axially spaced relation and connecting both cylinders therebetween, an intermediate rubber plate means partitioning axially an enclosure surrounded by both cylinders and both rubber members into a first and a second liquid chambers, an orifice for communication with both chambers apertured in the intermediate means, and a liquid filled in both chambers. The intermediate rubber plate means is configured, when assembled, so as to be preliminarily deformed in the shearing direction, assuming a shade-like form and, when imposed with a prescribed load, so as to retain a neutral state of intersecting orthogonally both cylinders, whereby equalized vibration-preventing characteristics against oscillations on both bound and rebound sides are achieved.

6 Claims, 3 Drawing Sheets

LIQUID-SEALED BODY MOUNT

BACKGROUND OF THE INVENTION:

1. Field of the Invention:

This invention relates to a liquid-sealed body mount, which is interposed between a cabin and a chassis frame of motor vehicles, especially motor trucks, to support them in a vibration insulating manner.

2. Description of Related Art:

There are known various body mounts of this type, and for example, a liquid-sealed body mount as illustrated in FIG. 5 is known from Japanese Patent First Publication 60-139942 ('85). The mount comprises an inner cylinder (1') and an outer cylinder (2'), two rubber members (3')(4') extending between both cylinders, an intermediate rubber plate member (5') partitioning the rubber members (3')(4') and extending between both cylinders (1')(2'), two liquid chambers (6')(7') enclosed on both sides of the intermediate rubber plate member (5'), an orifice (8') apertured in the intermediate rubber plate member (5') and communicating with both liquid chambers (6')(7') therethrough, and a liquid filled in both chambers (6')(7'). Another body mounts of similar structures are disclosed, for example, in Japanese Patent First Publications 62-188832 ('87) and 62-224744 ('87), which are depicted in FIG. 6 and FIG. 7, respectively.

With the known body mounts, under an unloaded condition after their assembly, the intermediate rubber plate member (5') intersects nearly orthogonally the inner and outer cylinders (1')(2') to take a horizontal orientation, which constitutes an unloaded neutral position.

On the other hand, when the mount so constructed is installed at a definite location of a motor vehicle and applied thereto with a rated load, thus being in a stationary state, the inner cylinder (1') is displaced to be depressed relatively to the outer cylinder (2') depending upon the magnitude of the load the inner cylinder (1') bears, which results in the state as shown in FIG. 5 in the broken lines. A deformation or deflection in the gravity direction, i.e., shearing direction is thus imparted to the mount in the stationary state.

If oscillations are transmitted to the vehicle body, in the state that such shear deformation is imparted to the mount, for bounding oscillations which cause to depress further the inner cylinder (1') side, the intermediate rubber plate member (5') is deviated slightly because of its small spring rate and consequently, vibration-damping effect due to the liquid flowing through both liquid chambers (6')(7') is not so significantly obtained whereas for rebounding oscillations, vibration-damping effect due to the flow of liquid is larger than that of the bounding oscillations, because of a high spring rate. Hence, a problem with such body mount is that any equalized or balanced vibration-preventing characteristics against oscillations have not been achieved.

In order to solve the foregoing problem and drawbacks of known body mounts, this invention has been accomplished by providing the construction that a deformation in the shearing direction can be preliminarily imparted to an intermediate rubber plate member in the reverse sense to the direction in which loads are imposed on it so that the intermediate rubber plate member may be retained in the horizontal neutral state under conditions where a stationary load is applied.

Accordingly, it is an essential object of this invention to provide a body mount designed to exhibit balanced or equalized vibration-preventing characteristics on both bounding and rebounding sides thereby to reduce the oscillations on the cabin side of motor vehicles and improve the riding comfort.

SUMMARY OF THE INVENTION

This invention consists in a liquid-sealed body mount, as will be seen from the accompanying drawings illustrative of examples, which comprises an inner cylinder and an outer cylinder disposed in a concentric relation; a first rubber member and a second rubber member extending in an axially spaced relation to each other between both cylinders thereby to connect both cylinders; intermediate rubber plate means interposed between both rubber members to partition a space enclosed between both rubber members and extending between the inner and outer cylinders; a first liquid chamber and a second liquid chamber defined on both sides of the intermediate rubber plate means and enclosed between the intermediate rubber plate means and the first rubber member and between the intermediate rubber plate means and the second rubber member, respectively; an orifice apertured in the intermediate rubber plate means for communicating with both liquid chambers solely therethrough; and a liquid filled in both liquid chambers, and which is characterized in that the intermediate rubber plate means is configured, when assembled, so as to be deformed in the shearing direction with its inner cylinder side and its outer cylinder side axially deviated to assume a shade-like form and, when a prescribed relative load is imposed between the inner and and outer cylinders, so as to be capable of retaining the neutral state of intersecting nearly orthogonally both cylinders.

According to a preferred embodiment of this invention, a body mount having the foregoing construction is further characterized in that the first rubber member is bonded by vulcanization, at the radially outer and radially inner peripheral portions thereof, to an insert cylinder which is fitted in the outer cylinder on the one side and to the inner cylinder on the one end side, respectively; the intermediate rubber plate means is bonded by vulcanization at the inner and outer peripheral portions thereof, to a second sleeve and a ring element, respectively, the former being fitted in place on the inner cylinder midway between both ends thereof and the latter being fitted in place in the outer cylinder midway between both ends thereof; the second sleeve is held in place endwise between the first rubber member and the first sleeve, and the ring element is held in place endwise between the second rubber member and the insert cylinder.

In this way, the intermediate rubber plate means is preliminarily imparted with a shear deformation in the direction it can oppose loads, in its unloaded state after assembly to a mount and consequently, when installed in a car body at a definite location and loaded, the intermediate rubber plate means assumes the original neutral state. As a consequence, the intermediate rubber plate means shows equalized or balanced displacement against any oscillations irrespective of bounding and rebounding sides, thereby to provide a mount capable of exhibiting equalized and stable vibration-preventing characteristics.

Further, the mount in a preferred embodiment has a construction suitable for the production of mounts in which a shear deformation is preliminarily imparted, and is composed of three sub-assemblies relating to the first rubber member, the second rubber member, and the intermediate rubber plate means, respectively. Accordingly, it is possible to afford easily a shear deformation by carrying out the assembly procedure which comprises fitting the second sleeve onto the inner cylinder to secure in place, thereby to abut the ring element on the insert cylinder and subsequently, plugging the ring element and the insert cylinder into the outer cylinder to secure in place, concurrently with which the second sleeve is fitted onto the inner cylinder and seated firmly. Further, sealing of a liquid can be effected simultaneously when the foregoing two-stage fitting work is processed within the liquid.

DETAILED DESCRIPTION OF THE PREFERRED EMBODIMENTS

Figure 1:
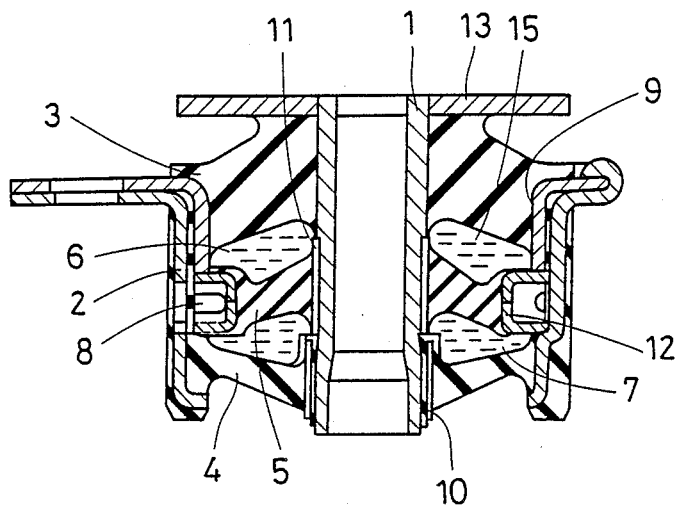
FIG. 1 is an elevational view in cross-section of one example of a body mount according to this invention.

The invention will be hereinbelow described in more detail with reference to FIG. 1 to FIG. 4.

An inner cylinder 1 and an outer cylinder 2 are each made of a steel. The inner cylinder 1 is constructed as a generally cylindrical body having an offset external profile and consists of the upper terminal section which corresponds to the inner peripheral portion of a first rubber member 3 (as hereinafter described) to be bonded by vulcanization thereto, the middle portion and the lower terminal portion, the upper terminal section having a larger thickness than the middle and lower terminal portions. To the top of the upper terminal portion of the inner cylinder 1, an upper bracket 13 in a plate form is attached integrally by welding.

The outer cylinder 2 has a diameter of three to four times that of the inner cylinder 1 and a shorter cylinder length than the inner clylinder 1. The one terminal portion constituting an upper end of the outer cylinder 2 is formed as an elliptical flange overhanging squarely, wherein the maximal and minimal breadth portions of the flange confront radially and the breadth is gradually varied between the maximal breadth and minimal breadth, whereas the other terminal portion constituting a lower end is formed as a lip portion by being bent inboard in some length.

The inner cylinder 1 and the outer cylinder 2 are disposed concentrically and connected to each other through a first rubber member 3, a second rubber member 4 and intermediate rubber plate means 5 extending between both cylinders 1, 2.

The first rubber member 3 and the second rubber member 4 serve as a rubber snubber for absorbing the direct transmission of oscillations between both cylinders 1, 2. The first rubber member 3 is configured to a shade-like member with its middle portion protuberant upwardly and has a largest wall thickness among the three rubber elements, thus mainly serving to carry loads. The first rubber member 3 is bonded by vulcanization, at its central, radially inner periphery to the outer periphery of the thick-walled upper terminal section of the inner cylinder 1 and ,at its upper edge portion, to the lower central portion of the upper bracket 13 and likewise bonded by vulcanization, at its radially outer periphery, to the inner peripheral portion of an insert cylinder 9.

The insert cylinder 9 is of such a size that it can be airtightly intercalated and fitted on the inner periphery of the outer cylinder 2 on the one end side and has a short cylinder length of approximately one third the cylinder length of the outer cylinder 2. The insert cylinder 9 is formed of a flange overhanging on the one end side which is conformable in shape to the flange of the outer cylinder 2, and fitted to the outer cylinder 2 so that both flanges may fay together and the narrowest-breadth portions of the flanges are integrally bonded together by caulking or the like.

In contrast to the first rubber member 3, the second rubber member 4 assumes a bowl-like shape with its radially outer peripheral portion raised to some extent above its central portion. The outer periphery of the second rubber member 4 is bonded by vulcanization to the inner peripheral portion of the outer cylinder 2 on the other end side whereas the central inner periphery of the second rubber member 4 is bonded by vulcanization to the outer periphery of a first sleeve 10.

The first sleeve 10 is of a cylinder having such an appropriate diameter that it can be floatingly mounted in the other terminal portion of the inner cylinder 1 and is internally attached with a thin rubber membrane thereby to retain airtightness.

The first sleeve 10 is fastened to and rendered integral with the inner cylinder 1 by floatingly mounting it on the other terminal portion of the inner cylinder 1 and then subjecting the other terminal portion of the inner cylinder 1 to upsetting processing with the aid of a jig.

On the other hand, the intermediate rubber plate means 5 is of a rubber plate extending between the inner and outer cylinders 1, 2 so as to be interposed between the first rubber member 3 and the second rubber member 4. The intermediate rubber plate means 5 is formed, at the midway portion thereof, to be thin-walled as compared with the inner peripheral portion and the outer peripheral portion thereof. The inner and outer peripheral portions of the means 5 are bonded by vulcanization to the outer periphery of a second sleeve 11 and a ring element 12 assuming a U-shape crosssection, respectively.

The second sleeve 11 is cylinder-formed, having such an inside diameter that it can be press-fitted in place on the inner cylinder 1 at the middle portion thereof, namely. an area in the thin-outside diameter section which area is adjacent to the thick-outside diameter section of the inner cylinder 1.

The ring element 12 is shaped, for example, by butt welding a pair of flanges of an identical shape into a ring body assuming a U-formed cross-section, with its recess being faced outboard. Simultaneously when the intermediate rubber plate means 5 and the ring element 12 are treated for vulcanization bonding, a thin-layer of rubber of the same kind is bonded by vulcanization to the inside wall of the recess. As a result, a ring-like channel having two extremities and surrounded by the thin rubber layer is defined along the outer periphery of the ring element 12. The ring-like channel terminating in both extremities is put in communication with a cutout apertured at the upper face of the ring element 12 at the one extremity and with a cutout apertured at the lower face of the ring element 12 at the other extremity, whereby the channel is constructed as an orifice 8 serving to brake or retard the flow of a liquid therethrough. It will be appreciated that the orifice 8 is not limited to the construction of the example as illustrated, and it is also possible to form the orifice on the second sleeve side.

The ring element 12 thus constructed is inserted and fitted airtightly in the outer cylinder 2 at its middle portion.

The outer cylinder 2 is, simultaneously when bonded by vulcanization to the second rubber member 4, coated with a thin rubber membrane of the same kind along the inside wall thereof so that the rubber membrane can serve to retain airtightness upon assembly to a mount, as hereinafter described.

The body mount can be assembled in the following procedure, which is performed throughout in a tank (not shown) filled with a liquid 15 with the instrumentality of a suitable jig.

Figure 2:
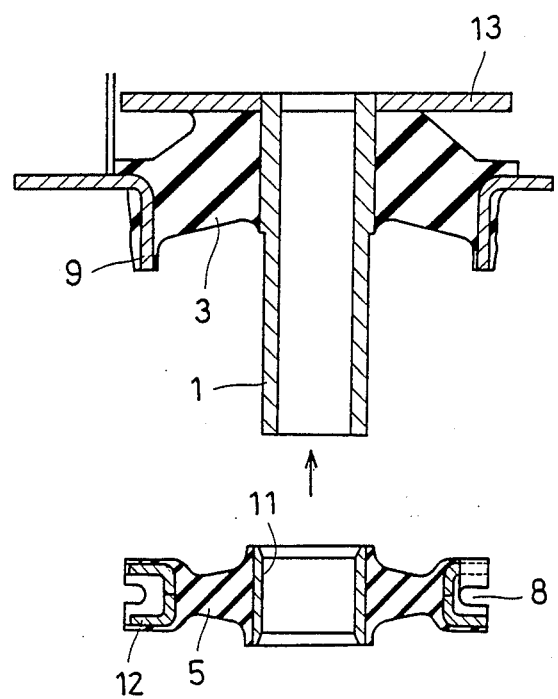
FIG. 2 and FIG. 3 are exploded views in sectional elevation of the mount in FIG. 1 showing units thereof in the assembly order.

First, to a first unit sub-assembly comprising the inner cylinder 1, the first rubber member 3 and the insert cylinder 9, a second unit sub-assembly comprising the intermediate rubber plate means 5, the second sleeve 11 and the ring element 12 is fastened as shown in FIG. 2.

Figure 3:
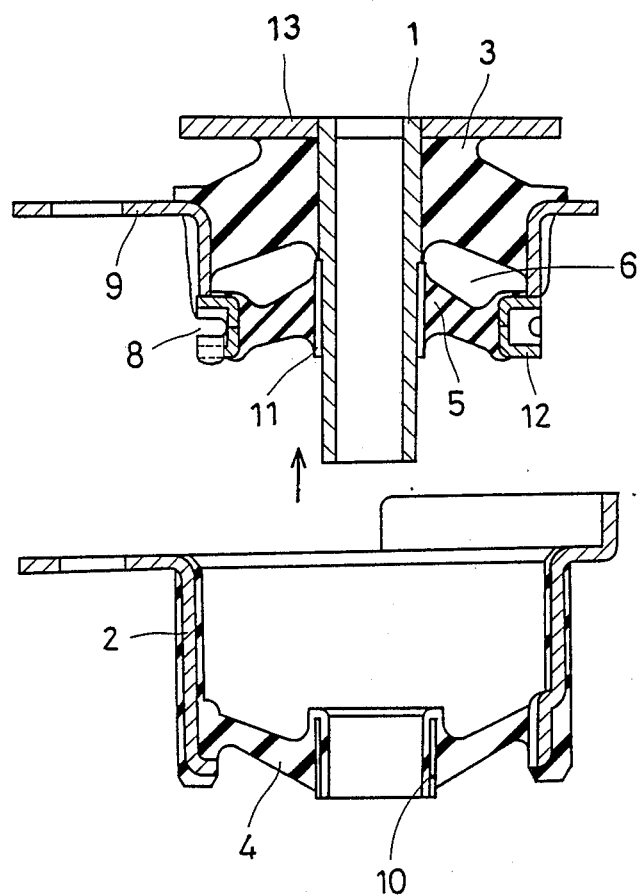

At that time, the second sleeve 11 is press-fitted onto the inner cylinder 1 until the ring element 12 abuts against the insert cylinder 9 of the same outside diameter, and when the second sleeve 11 is further driven on the thin-outside diameter portion of the inner cylinder 1 far enough aft, the intermediate rubber plate means 5 is deformed in the shearing direction and the direction opposing loads to be imposed afterwards, assuming a shade-like or conical form as shown in FIG. 3 with its central portion raised. Between the first rubber member 3 and the intermediate rubber plate means 5, an airtight liquid chamber communicating with the orifice 8 is thus formed, constituting a first liquid chamber 6.

Then, a second assembly process will be initiated, in which a third unit sub-assembly comprising the outer cylinder 2, the second rubber member 4 and the first sleeve 10 are further set up, as shown in FIG. 3.

In that process, the inner cylinder 1 is plugged into and floatingly mounted in the first sleeve 10, concurrently with which while the ring element 12 and the insert cylinder 9 are press-fitted into the outer cylinder 2, the first sleeve 10 and the second sleeve 11 are abutted and the ring element 12 and the upper outside peripheral portion of the second rubber member 4 are abutted. While retaining that state, caulking processing is performed between the flange of the outer cylinder 2 and the flange of the insert cylinder 9. Subsequently, a load which conforms to the load when surmounted with a motor vehicle is applied to the other end of the inner cylinder 1, which is, in turn, subjected to upsetting processing and tightly secured to the first sleeve 10.

Thus, the assembly of the three unit sub-assemblies is completed, and an airtight liquid chamber communicating with the orifice 8 is formed between the second rubber member 4 and the intermediate rubber plate means 5, constituting a second liquid chamber 7. Within the first liquid chamber 6 and the second liquid chamber 7, the liquid 15 is filled.

In the body mount after the completion of assembly, hence, the first liquid chamber 6 and the second liquid chamber 7 communicate with each other solely through the orifice 8 and the intermediate rubber plate means 5 is predeformed in the shearing direction as shown in FIG. 1.

Figure 4:
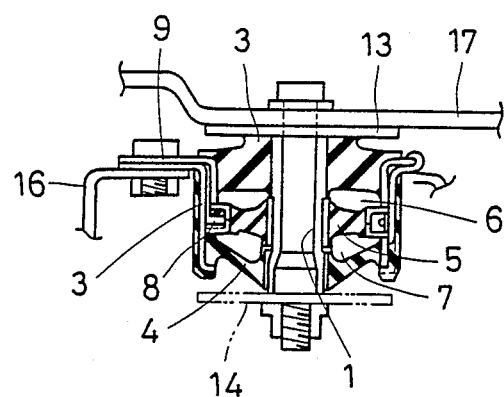
FIG. 4 is an elevational view in cross-section of the mount in FIG. 1 showing its state when installed in a motor vehicle.
Figure 5:
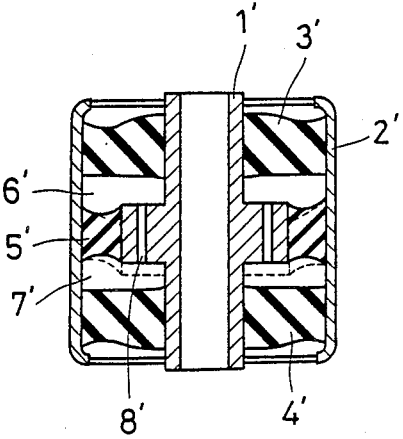
FIG. 5 to FIG. 7 are cross-sectional elevational views of prior art body mounts.
Figure 6:
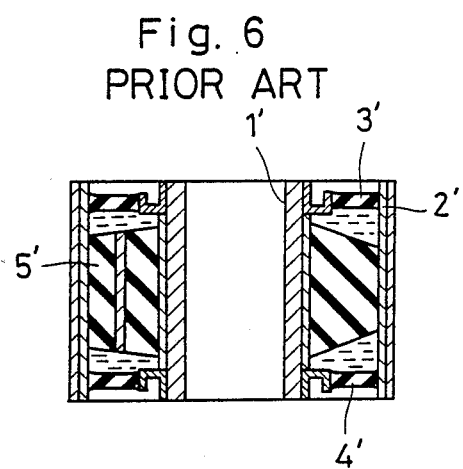
Figure 7:
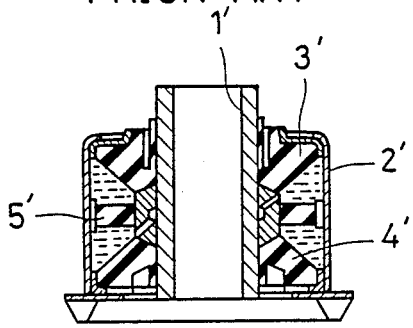

The body mount is used as a shock absorber for motor vehicles, as shown in FIG. 4, by clamping the outer cylinder 2 to a bracket 16 of a chassis frame by means of bolts and nuts through alignment of holes in the superposed flanges of the outer cylinder 2 and the insert cylinder 9 and, on the other hand, by clamping the inner cylinder 1 to a floor base 17 of a cabin by means of a bolt and nut inserted in the inner cylinder 1.

By this installation of the mount to a vehicle, the load of the cabin is applied to the inner cylinder 1 and consequently, the inner cylinder 1 is shifted downwardly to some extent in the axial direction. Consequent upon it, the intermediate rubber plate means 5 assuming a shade-like form is changed to a horizontal plate state, which is a neutral state when in use. Here, by the "neutral state" is meant a state in which the intermediate rubber plate retains virtually its as-vulcanized shape and is not displaced forcedly.

Thus, the intermediate rubber plate means 5 makes undeviated and equalized movement against oscillations on the bound side and rebound side, which movement encourages a stable flow of the liquid between both liquid chambers 6,7 through the orifice 8 and allows to exhibit homogeneous vibration-damping characteristics.

According to the body mount of this invention, since the intermediate rubber plate means 5 is pre-deformed in the shearing direction opposing loads, it is possible to retain the ideal neutral state that the intermediate rubber plate means 5 is extended substantially horizontally when a load is applied in use. As a consequence, not only is durability of the intermediate rubber plate means 5 increased, but also against any oscillations on the bound side and the rebound side, equalized vibration-damping characteristics attending on liquid passage under the same conditions are exhibited. Moreover, according to the second embodiment of this invention, press-fitting of the second sleeve 11 onto the inner cylinder 1 at a definite area, butt holding of the second sleeve 11 between the first rubber member 3 and the first sleeve 10, and positioning of the ring element 12 by the fitting of the outer cylinder 2 to the insert cylinder 9 are performed sequentially, whereby it is possible to simply and positively effect the pre-deformation of the intermediate rubber plate means 5, and assembling is facilitated in a liquid and simultaneously, sealing of the liquid can be achieved. Hence, the production cost is significantly reduced.

What is claimed is:

1. A liquid-sealed body mount, comprising:
   an inner cylinder and an outer cylinder disposed in a concentric relation;
   a first rubber member and a second rubber member connected to and extending between both cylinders in axially spaced relation to each other to define a chamber therebetween;
   an insert cylinder fitted in said outer cylinder adjacent one end thereof, said first rubber member being bonded by vulcanization, at its radially outer and inner peripheral portions, to said insert cylinder and said inner cylinder adjacent said one end;
   a first sleeve fitted on said inner cylinder adjacent an other end thereof, said second rubber member being bonded by vulcanization, at its radially outer and inner peripheral portions, to said outer cylinder adjacent said other end and said first sleeve, respectively;

an intermediate rubber plate means interposed between said first and second rubber members for partitioning said chamber into a first liquid chamber and a second liquid chamber, the former being defined between said intermediate rubber plate means and said first rubber member and the latter being defined between said intermediate rubber plate means and said second rubber member, said intermediate rubber plate means including an intermediate rubber plate, a second sleeve fitted in place on said inner cylinder midway between both ends and a ring element fitted in place in said outer cylinder midway between both ends, said intermediate rubber plate being bonded by vulcanization, at its inner and outer peripheral portions, to said second sleeve and said ring element, respectively, said second sleeve being held in place endways between said first rubber member and said first sleeve and said ring element being held in place endways between said second rubber member and said insert cylinder;

means defining an orifice in said intermediate rubber plate means communicating with both of said first and second liquid chambers exclusively therethrough;

a liquid filled in both of said first and second liquid chambers, said intermediate rubber plate means being configured so that, when assembled, it is held in place by being deformed in a shearing direction with its inner peripheral portion on an inner cylinder side and its outer peripheral portion on an outer cylinder side being axially offset, thus assuming a conical form whereas, when a prescribed load is imposed between said inner cylinder and said outer cylinder, said intermediate rubber plate means will retain its neutral and relaxed state and be nearly orthogonally related to both cylinders.

2. The liquid-sealed body mount as set forth in claim 1, wherein said first rubber member has a thicker walled construction than the two other rubber members.

3. The liquid-sealed body mount as set forth in claim 1, wherein said ring element is formed as a ring having a U-shape in a vertical cross-section with its recess portion facing radially outwardly and said recess portion defining a channel having two extremities opening at upper and lower faces of said ring element thereby to define said orifice.

4. The liquid-sealed body mount as set forth in claim 1, wherein said insert cylinder and said outer cylinder have each, adjacent said one end, elliptic flanges which are spliced and caulked together and have a conjointly defined hole for facilitating a fastening to a body frame.

5. The liquid-sealed body mount as set forth in claim 1, wherein said inner cylinder is upset adjacent said other end to thereby secure it firmly to said first sleeve.

6. The liquid-sealed body mount as set forth in claim 4, wherein said mount is assembled in sequential steps comprising: press-fitting a second sub-assembly including said intermediate rubber plate means, said second sleeve and said ring element to a first sub-assembly including said inner cylinder, said first rubber member and said insert cylinder so that said intermediate rubber plate means is deformed to a conical form in the shearing direction and the direction opposing loads to be applied later;

press-fitting a third sub-assembly including said outer cylinder, said second rubber member and said first sleeve to said first and second sub-assemblies;

subjecting to caulking processing between said flanges of said outer cylinder and the insert cylinder;

and subjecting to upsetting processing adjacent said other end of said inner cylinder so as to secure said first sleeve thereto, said steps being performed within a liquid so that said first and second liquid chambers are filled with said liquid and communicate with each other through said orifice.

* * * * *